United States Patent [19]

Kéri

[11] Patent Number: 5,280,858

[45] Date of Patent: * Jan. 25, 1994

[54] PROCESS FOR WORKING UP WASTE ACTIVE-MASS OF CONSUMED, BROKEN ACCUMULATOR PLATES DERIVING FROM RUBBISH-SHOOTS INTO ACTIVE-MASS

[75] Inventor: József Kéri, Budapest, Hungary

[73] Assignee: Akkumulator es Szarazelemgyar, Budapest, Hungary

[*] Notice: The portion of the term of this patent subsequent to Nov. 5, 2008 has been disclaimed.

[21] Appl. No.: 780,408

[22] Filed: Oct. 17, 1991

Related U.S. Application Data

[63] Continuation-in-part of Ser. No. 737,739, Jul. 30, 1991, abandoned.

[30] Foreign Application Priority Data

Dec. 19, 1990 [HU] Hungary .............................. 8340/90

[51] Int. Cl.$^5$ .............................................. B02C 23/00
[52] U.S. Cl. ............................. 241/23; 241/DIG. 38; 429/49
[58] Field of Search ................... 241/14, 23, DIG. 38; 429/49

[56] References Cited

U.S. PATENT DOCUMENTS

| | | | |
|---|---|---|---|
| 3,456,886 | 7/1969 | Tremolada | 241/14 |
| 4,009,833 | 3/1977 | Litt et al. | 241/14 |
| 4,384,683 | 5/1983 | Huwald et al. | 241/23 |
| 5,062,574 | 11/1991 | Kéri | 241/23 |

Primary Examiner—Wayne Langel
Attorney, Agent, or Firm—Keil & Weinkauf

[57] ABSTRACT

The present invention relates to a process for working up waste active-mass of consumed, broken accumulator plates, deriving from rubbish-shoots, into active mass, wherein the waste active-masses removed from positive and negative plates are deacidified, washed with water, separately stored and then subjected to heat-treatment. According to the process of the invention the air-dry positive or negative active-mass or the mixture thereof is subjected a) to heat-treatment at a temperature of 630° to 700° C. for 8 to 60 minutes, then either ground in a manner known per se or fed into a lead-powder mill in an amount of at most 80% by mass, calculated on the mass of the lead charged into the mill, and in both cases ground to an average particle size of less than 60μ, or b) to grinding in a manner known per se, preferably to an average particle size of less than 60μ, then subjected to a heat-treatment at a temperature of 630° to 700° C. for 8 to 60 minutes, then from the thus-obtained material positive or negative active-mass is prepared when positive or negative active-mass was used as starting material, or negative active-mass is prepared when a mixture of positive and negative active-masses was used as starting material.

8 Claims, No Drawings

PROCESS FOR WORKING UP WASTE ACTIVE-MASS OF CONSUMED, BROKEN ACCUMULATOR PLATES DERIVING FROM RUBBISH-SHOOTS INTO ACTIVE-MASS

This application is a continuation-in-part of application Ser. No. 737,739, filed on Jul. 30, 1991, now abandoned.

TECHNICAL FIELD

The invention relates to a process for working-up waste active-mass of industrially operated consumed, broken accumulator plates, deriving from rubbish-shoots, into active-mass, wherein the waste active-masses removed from positive and negative plates are deacidified, washed with water, separately stored and then subjected to heat-treatment.

BACKGROUND ART

The starting material for the production of active-mass is lead powder. Lead powder is prepared from lead, e.g. in a Barton mill usually known in the industry, and in the course of milling, depending on the grinding conditions, lead oxide is also formed in different ratios.

The powder thus obtained is subjected to sulfuric acid/phoshoric acid treatment, depending on whether positive or negative active-mass is aimed to be prepared, and additives, e.g. sulfuric acid, barium sulfate, carbon black, are mixed to the product thus obtained. The resulting crude active-mass is spread onto electrodes of grid structure with the aid of a spreading machine. Then further operations are carried out on the mass thus applied onto the plates, e.g. pre-drying and aging. Finally the plates are placed into containers, wherein optionally the appropriate polarities are bound together, then the containers are filled with an acid and then closed.

In the accumulator production a certain amount of defective product is also produced, the accumulators are consumed during operation, they become unserviceable and sooner or later they are deposited in rubbish-shoots.

Therefore, the need for the reprocessing of unserviceable accumulators, especially of their most expensive and poisonous lead plates and masses, and the recycling of the same into the current production, exists for a long time. According to the most wide-spread method the accumulators are dismantled, washed, etc. and subjected to metallurgical treatment, i.e. the lead alloy of the plate grid is melted, then a grid is formed from the melt.

Several processes are known for the re-use of the negative active-mass content of waste plates. According to U.S. patent specification Ser. No. 4,009,833 the separated active-mass is recycled into the mixing machines. This process is more economic than the multi-step chemical method when the active-mass is separated into its components by a wet chemical method but this method can be used only for the working up of negative active-mass waste.

The common disadvantages of the known processes are the high energy- and water demand, low efficacy, health hazard and environment pollution.

In the course of production wastes are also formed e.g. when spreading the active-mass onto the grid, while drying and during formation of the plates, etc. The working up of the said waste is described in Hungarian patent specification Ser. No. 201,179.

The aim of our experiments and examinations was to find a simple process for the recycling of waste positive and negative active-masses separated from the consumed, industrially operated, broken accumulator plates deriving from rubbish-shoots, i.e. not from the factory, into the active-mass production in a simple way, without causing any deterioration in quality of the accumulators being the end-products of the process.

The invention is based on the recognition that the above aim can be achieved if the negative and positive active-masses deriving from consumed, broken, unserviceable accumulators of rubbish-shoots are washed acid-free, appropriately ground and subjected to a special heat-treatment. The quality of the accumulators assembled with the thus-obtained active-mass is equal to that of accumulators assembled with fresh active-mass.

The invention is based on the further recognition that the mixture of waste positive and negative active-masses can be worked up into negative active-mass of good quality. This recognition is surprising as it overcomes a technical prejudice. Namely, formerly it was an accepted view of persons skilled in the art that if production-refuse active-mass is used as starting material, negative active-mass of suitable quality can be prepared only from separately stored and treated negative active-mass waste (Hungarian patent specification No. 201,179).

SUMMARY OF THE INVENTION

Thus, the invention relates to a process for working up the waste active-mass of industrially operated consumed, broken accumulator plates, deriving from rubbish-shoots, into active-mass, wherein the waste active-masses removed from the positive and negative plates are deacidified, washed with water, separately stored under air-dry conditions and then subjected to heat-treatment.

DETAILED DESCRIPTION OF THE INVENTION

According to the invention the air-dry positive or negative active-mass or the mixture thereof is subjected a) to heat-treatment at a temperature of about 500° to 700° C., preferably 630° to 700° C., more preferably at 650° to 680° C., still more preferably 680° to 675° C., for 8 to 60 minutes, then either ground in a manner known per se or fed into a lead-powder mill in an amount of at most 80% by mass, calculated on the mass of the lead charged into the mill, and in both cases ground to an average particle size of less than 60μ, or b) to grinding in a manner known per se, preferably to an average particle size of less than 60μ, then subjected to a heat-treatment at a temperature of about 500° to 700° C., preferably 630° to 700° C., more preferably at 650° to 680° C., still more preferably 680° to 675° C., for 8 to 60 minutes, then from the thus-obtained material positive or negative active-mass is prepared when positive or negative active-mass was used as starting material, or negative active-mass is prepared when a mixture of positive and negative active-masses was used as starting material.

The main advantages of the process of the invention are as follows:

a) The complete re-processing of waste accumulators deriving from rubbish-shoots is possible. After the mechanical dismantling, deacidifying and washing of the unserviceable accumulators, the total amount of the active-masses of the plates can be recycled into the accumulator production. As the plates and their masses are the most expensive components of the accumulators, the process is very economical.

b) The material of the waste plates is re-used in the accumulator production itself and not in an other industry. Thus, the amount of fresh lead required for the accumulator production is reduced, whereby the economy of the production is further enhanced.

c) The pollution caused by the storage of lead or lead compounds, being extremely harmful to the enviroment, is considerably reduced or fully eliminated.

The invention is further illustrated by the following non-limiting examples.

EXAMPLE 1

Air-dry positive active-mass deriving from rubbish-shoots is heat-treated at a temperature of 670° to 680° C. for 45 minutes in a closed apparatus, then fed into a powder mill in an amount of 25% by mass, calculated on the lead fed into the mill. The whole amount of material leaving the mill must fall through a 60 mesh screen. Then the material is mixed to 12 to 13% by mass of ion-exchanged water, thereafter 10% by mass of sulfuric acid (density: 1.3 kg/dm$^3$), and then 2% by mass of phosphoric acid are added under continuous stirring. Stirring is continued for 3 minutes, then the substance is removed from the mixer and after cooling the positive active-mass thus obtained is spread onto lead grids in a manner known per se. After spreading the usual operations (aging, drying, etc.) are carried out.

EXAMPLE 2

The waste negative active-mass is ground in a Barton mill, then subjected to heat-treatment at a temperature of 675° to 680° C. for 40 minutes. The heat-treated mass is fed into a powder mill in an amount of 75% by mass, calculated on the lead fed into the mill. Thereafter the process of Example 1 is followed.

EXAMPLE 3

The process of Example 1 is followed except that a waste active-mass mixture composed of about 4 parts by mass of negative and 1 part by mass of positive active-mass is used as starting material. In this way negative active-mass is obtained.

Table 1 summarizes the average of test results obtained by using accumulators prepared from the waste active-mass according to the invention and by the conventional method, respectively.

The capacity tests were carried out according to IEC 95-1 (1988), the test on resistance against overcharging and the cold starting tests were carried out according to Hungarian Standard No. 591-1977 and IEC 95-1 (1988), respectively.

TABLE 1

| No. of cell | 1 | 2 | 3 |
|---|---|---|---|
| Amount of active mass g/Ah | 7.6 | 7.7 | 7.6 |
| Capacity, Ah | 97.8 | 97.9 | 97.8 |
| Res. ag. overch., min. | | 7' 50" | 7' 54" |

TABLE 1-continued

| No. of cell | 1 | 2 | 3 |
|---|---|---|---|
| Cold starting, min. | | 1' 41" | 1' 40" |

Res. ag. overch. = Resistance against overcharging after 4 cycles
Cell No. 1 = with the plates produced according to Examples 1 and 3
Cell No. 2 = with the plates produced according to Examples 2 and 3
Cell No. 3 = with the plates produced by the conventional process Table 1 clearly shows that there is no significant difference between the characteristic features of the accumulators prepared by using the active mass produced according to the invention and by the conventional method. This means that the use-value of the active-mass deriving from waste, consumed accumulators, worked up according to the invention, is equivalent to that of the fresh active-mass.

I claim:

1. A process for working up the waste active-mass of industrially operated consumed, broken accumulator plates into active-mass, which process comprises removing the waste active-masses from positive and negative plates, deacidifying the removed waste active-masses, washing the deacidified waste active-masses with water, storing the washed waste active-masses under air-dry conditions, subjecting the stored waste active-mass to heat treatment at a temperature of about 500° to 700° C. for 8 to 60 minutes, to produce a heat-treated positive or negative active-mass or a mixture of positive and negative active-masses, grinding the thus heat-treated active-mass to an average particle size of less than 60μ, then preparing from the thus-obtained material positive or negative active-mass when positive or negative active-mass was used as starting material, or preparing negative active-mass when a mixture of positive and negative active-masses was used as a starting material.

2. A process as defined in claim 1, wherein the heat treatment is carried out at a temperature of 650° to 680° C.

3. A process as defined in claim 1 wherein the heat treatment is carried out at a temperature of 660° to 675° C.

4. A process as defined in claim 1, wherein the heat treatment is carried out at a temperature of 630° to 700° C.

5. A process for working up waste active-masses of industrially operated consumed, broken accumulator plates into active-mass, which process comprises removing the waste active-mass from positive and negative plates, deacidifying the removed waste active-mass, washing the deacidified waste active-mass with water, storing the washed waste active-mass under air-dry conditions, grinding the air-dried waste active-mass to an average particle size of less than 60μ, heating the thus-ground waste active-mass at a temperature of about 500° to 700° C. for 8 to 60 minutes, then preparing from the thus-obtained material positive or negative active-mass when positive or negative active-mass was used as starting material, or preparing negative active-mass when a mixture of positive and negative active-masses was used as starting material.

6. A process as defined in claim 5, wherein the heat treatment is carried out at a temperature of 650° to 680° C.

7. A process as defined in claim 5, wherein the heat treatment is carried out at a temperature of 660° to 675° C.

8. A process as defined in claim 5, wherein the heat treatment is carried out at a temperature of 630° to 700° C.

* * * * *

UNITED STATES PATENT AND TRADEMARK OFFICE
CERTIFICATE OF CORRECTION

PATENT NO.: 5,280,858

DATED: January 25, 1994

INVENTOR(S): KERI et al.

It is certified that error appears in the above-identified patent and that said Letters Patent is hereby corrected as shown below:

On title page,

Item [75], Inventor: "Jézsef" should read --József--.

Signed and Sealed this

Sixteenth Day of May, 1995

Attest:

BRUCE LEHMAN

*Attesting Officer*     *Commissioner of Patents and Trademarks*